United States Patent
Huang et al.

(10) Patent No.: US 10,990,292 B2
(45) Date of Patent: Apr. 27, 2021

(54) FLASH MEMORY CONTROLLER, CONTROL METHOD OF FLASH MEMORY CONTROLLER AND ASSOCIATED ELECTRONIC DEVICE

(71) Applicant: Silicon Motion Inc., Hsinchu County (TW)

(72) Inventors: Guan-Yao Huang, Kaohsiung (TW); Yu-Chih Lin, Hsinchu County (TW); Chang-Wei Shen, Taoyuan (TW)

(73) Assignee: Silicon Motion, Inc., Hsinchu County (TW)

(*) Notice: Subject to any disclaimer, the term of this patent is extended or adjusted under 35 U.S.C. 154(b) by 0 days.

(21) Appl. No.: 16/413,615

(22) Filed: May 16, 2019

(65) Prior Publication Data

US 2020/0110543 A1    Apr. 9, 2020

(30) Foreign Application Priority Data

Oct. 9, 2018  (TW) .................................. 107135487

(51) Int. Cl.
*G06F 3/06*    (2006.01)

(52) U.S. Cl.
CPC .......... *G06F 3/0611* (2013.01); *G06F 3/0625* (2013.01); *G06F 3/0634* (2013.01); *G06F 3/0656* (2013.01); *G06F 3/0659* (2013.01); *G06F 3/0679* (2013.01)

(58) Field of Classification Search
CPC .... G06F 3/0679; G06F 3/0659; G06F 3/0634; G06F 3/0656; G06F 3/0611; G06F 3/0625

USPC ......................................................... 711/103
See application file for complete search history.

(56) References Cited

U.S. PATENT DOCUMENTS

2016/0055008 A1* 2/2016 Park .......................... G06F 9/24
                                                              713/2
2017/0206030 A1* 7/2017 Woo ..................... G06F 12/1408

FOREIGN PATENT DOCUMENTS

| TW | M286985       | 2/2006 |
|----|---------------|--------|
| TW | 200915090     | 4/2009 |
| TW | 201230043 A1  | 7/2012 |

* cited by examiner

*Primary Examiner* — Hua J Song
(74) *Attorney, Agent, or Firm* — Winston Hsu

(57) ABSTRACT

The present invention provides a flash memory controller, wherein the flash memory controller is arranged to access a flash memory module, the flash memory module includes a plurality of flash memory chips, the flash memory controller includes a buffer memory and a microcontroller, and the buffer memory is arranged to store an in-system programming (ISP) code. When the flash memory controller enters a power saving mode, the microcontroller disables a portion of the buffer memory to make at least one portion of the ISP code disappear; and when the flash memory controller enters a normal mode from the power saving mode, the microcontroller reads said at least one portion of the ISP code from N flash memory chips within the plurality of flash memory chips, wherein N is a positive integer greater than one.

13 Claims, 4 Drawing Sheets

US 10,990,292 B2

FLASH MEMORY CONTROLLER, CONTROL METHOD OF FLASH MEMORY CONTROLLER AND ASSOCIATED ELECTRONIC DEVICE

BACKGROUND OF THE INVENTION

1. Field of the Invention

The present invention is related to a flash memory controller, a control method thereof, and an associated electronic device.

2. Description of the Prior Art

When no access command is received from a host device, a flash memory controller usually enters a power saving mode, wherein a portion of power of a static random-access memory (SRAM) is disabled in order to save power consumption. A portion of an in-system programming (ISP) code originally stored in the SRAM may disappear, since a portion of the SRAM is disabled. Therefore, when the flash memory controller re-enters a normal mode, the ISP code must be re-read from a flash memory module in order to normally receive the access command from the host device and access the flash memory module. The flash memory controller may need a long time to read the ISP code since the size of the ISP code is large. Therefore, when the flash memory controller leaves the power saving mode, it may take a long time before the flash memory controller is able to process the access command from the host device, degrading the overall performance.

SUMMARY OF THE INVENTION

Thus, an objective of the present invention is to provide a flash memory controller, which can separate an ISP code into a plurality of flash memory chips. When the flash memory controller enters a normal mode from a power saving mode, a parallel read operation is utilized to read the ISP code from the plurality of flash memory chips in order to finish reading the ISP code, which can solve the problems of the related art.

In an embodiment of the present invention, a flash memory controller is disclosed, wherein the flash memory controller is arranged to access a flash memory module. The flash memory module comprises a plurality of flash memory chips, and the flash memory controller comprises a read only memory, a buffer memory and a microcontroller. The read only memory is arranged to store a program code, the buffer memory is arranged to temporarily store an in-system programming (ISP) code, and the microcontroller is arranged to execute the program code and the ISP code to control access to the flash memory module. When the flash memory controller enters a power saving mode, the microcontroller disables a portion of the buffer memory to make at least one portion of the ISP code disappear; and when the flash memory controller enters a normal mode from the power saving mode, the microcontroller reads said at least one portion of the ISP code from N flash memory chips within the plurality of flash memory chips, wherein N is a positive integer greater than one.

In another embodiment of the present invention, an electronic device is disclosed. The electronic device comprises a flash memory module and a flash memory controller, wherein the flash memory comprises a plurality of flash memory chips, and the flash memory controller is arranged to access the flash memory module. In this embodiment, the flash memory controller comprises a buffer memory and a microcontroller, wherein the buffer memory is arranged to temporarily store an ISP code, and the microcontroller is arranged to execute the ISP code to control access to the flash memory module. When the flash memory controller enters a power saving mode, the microcontroller disables a portion of the buffer memory to make at least one portion of the ISP code disappear; and when the flash memory controller enters a normal mode from the power saving mode, the microcontroller reads said at least one portion of the ISP code from N flash memory chips within the plurality of flash memory chips, wherein N is a positive integer greater than one.

In another embodiment of the present invention, a control method of a flash memory controller is disclosed. The control method comprises: when the flash memory controller enters a power saving mode, disabling a portion of a buffer memory to make at least one portion of an in-system programming (ISP) code disappear; and when the flash memory controller enters a normal mode, reading said at least one portion of the ISP code from N flash memory chips within a plurality of flash memory chips, wherein N is a positive integer greater than one.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
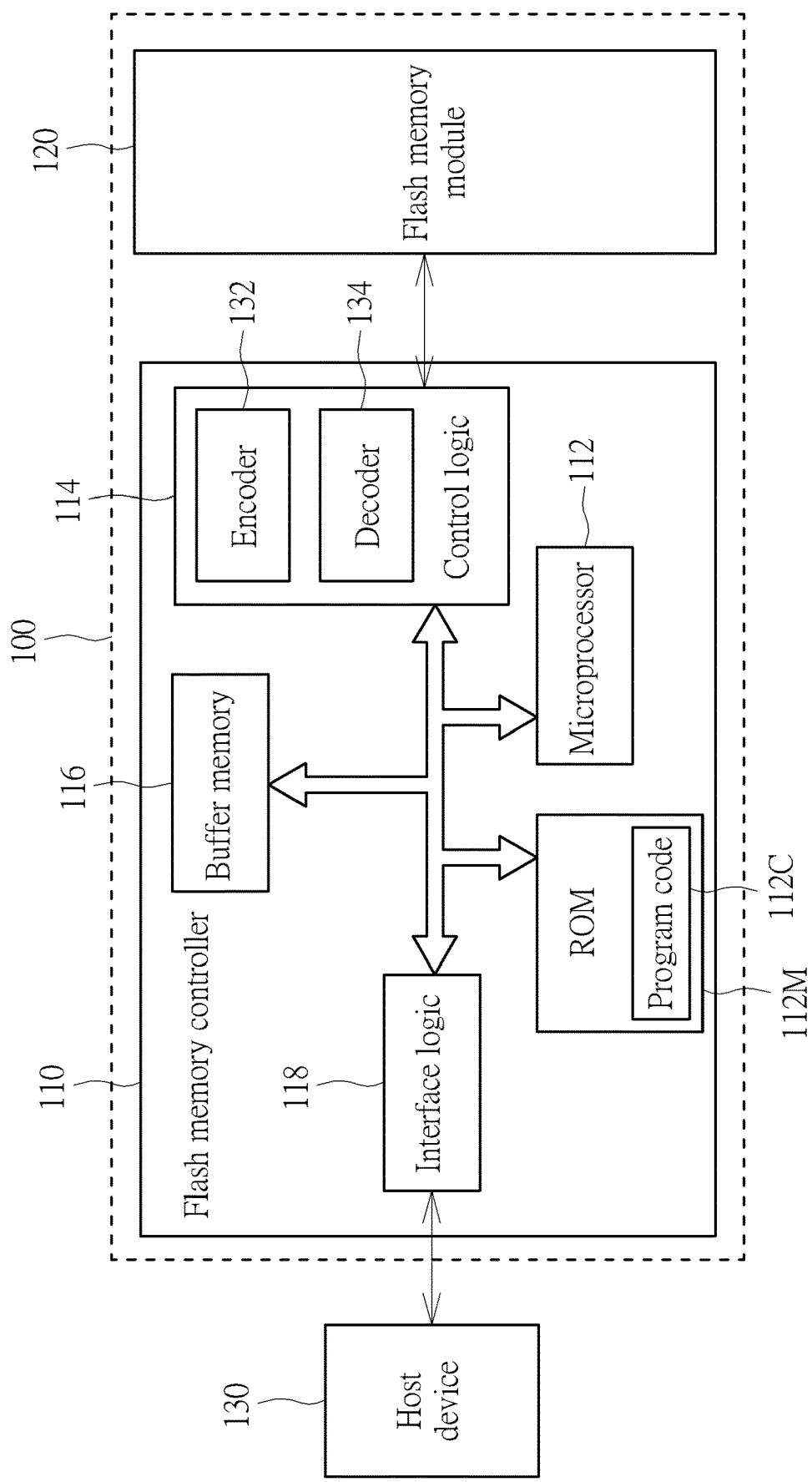
FIG. 1 is a diagram illustrating a memory device according to an embodiment of the present invention.

FIG. 1 is a diagram illustrating a memory device 100 according to an embodiment of the present invention. The memory device 100 comprises a flash memory module 120 and a flash memory controller 110, and the flash memory controller 110 is arranged to access the flash memory module 120. According to this embodiment, the flash memory controller 110 comprises a microcontroller 112, a read only memory (ROM) 112M, a control logic 114, a buffer memory 116 and an interface logic 118. The ROM 112M is arranged to store a program code 112C, and the microcontroller 112 is arranged to execute the program code 112C to control access to the flash memory module 120. The control logic 114 comprises an encoder 132 and a decoder 134, where the encoder 132 is arranged to encode data that is written into the flash memory module 120 to generate a corresponding check code (or error correction code (ECC)), and the decoder 134 is arranged to decode data that is read out from the flash memory module 120.

Under a typical condition, the flash memory module 120 comprises a plurality of flash memory chips, and each of the plurality of flash memory chips comprises a plurality of blocks. The flash memory controller 110 performs an erasing data operation on the flash memory 120 in the unit of blocks. In addition, a block may record a specific number of data pages, where the flash memory controller 110 performs a writing data operation on the flash memory module 120 in the unit of data pages. In this embodiment, the flash memory module 120 is a 3D NAND-type flash memory module.

In practice, the memory controller 110 controlled by a microprocessor 112 through executing the program code 112C may utilize internal components thereof to perform various control operations; for example, utilizing the control logic 114 to control access operations of the flash memory module 120 (more particularly, access operations on at least one block or at least one data page), utilizing the buffer memory 116 to perform required buffer operations, and utilizing the interface logic 118 to communicate with the host device 130. The buffer memory 116 is implemented by a random access memory (RAM). For example, the buffer memory 116 may be a static RAM (SRAM), but the present invention is not limited thereto.

In an embodiment, the memory device 100 may be a portable memory device (e.g. a memory card conforming to SD/MMC, CF, MS or XD specifications), and the host device 130 may be an electronic device that is connectable with a portable memory device; for example, mobile phones, laptop computers, personal computers, etc. In another embodiment, the memory device 100 may be a solid state drive (SSD) or an embedded storage device conforming to Universal Flash Storage (UFS) or Embedded Multi Media Card (EMMC) specifications, for being configured in an electronic device (for example, in a mobile phone, a laptop computer or a personal computer), and the host device 130 may be a processor of this electronic device.

Figure 2:
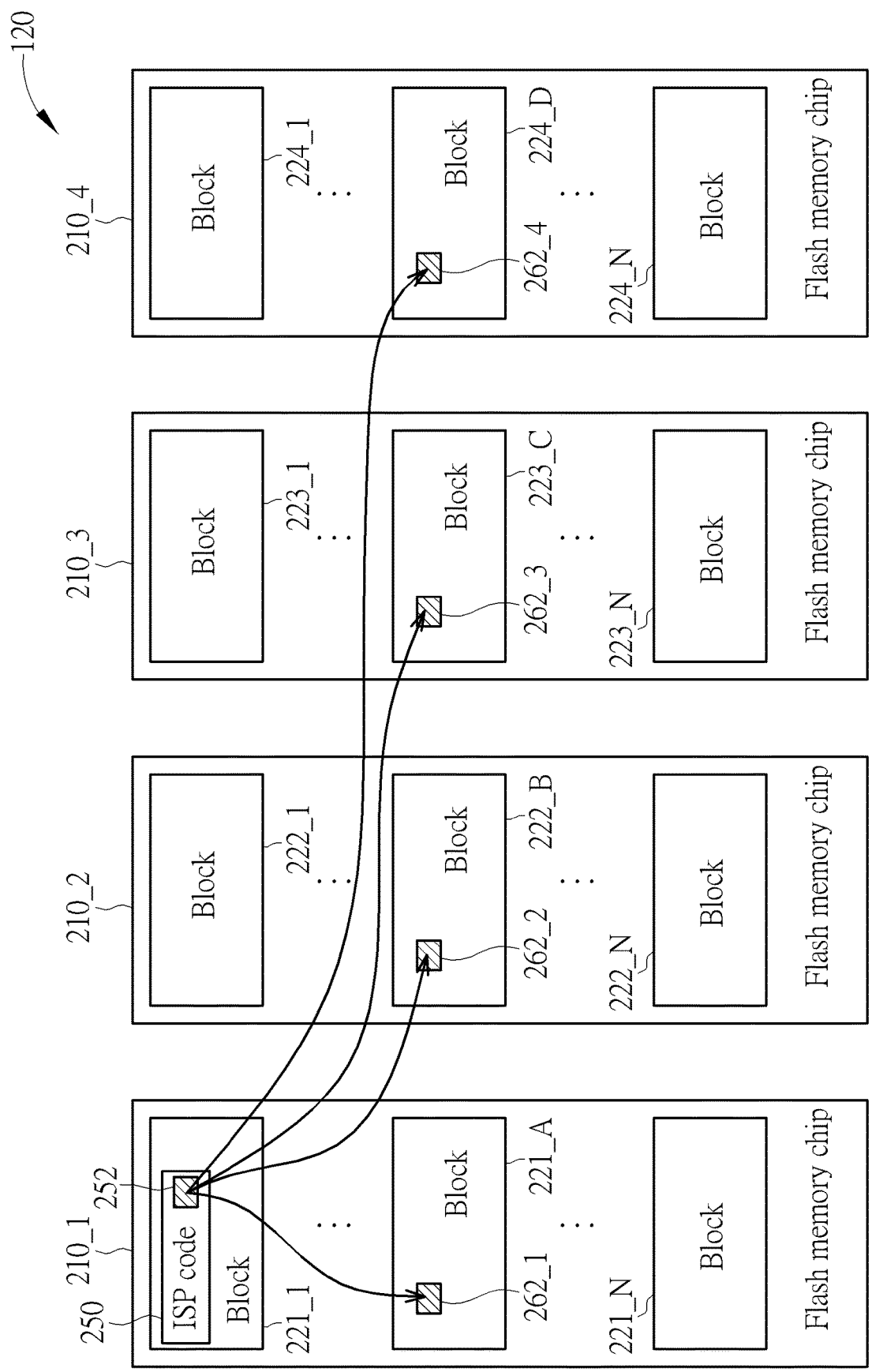
FIG. 2 is a diagram illustrating a flash memory module according to an embodiment of the present invention.

FIG. 2 is a diagram illustrating a flash memory module 120 according to an embodiment of the present invention. As shown in FIG. 2, the flash memory module 120 comprises the plurality of flash memory chips (only four flash memory chips 210_1, 210_2, 210_3 and 210_4 are illustrated in this embodiment), where the flash memory chip 210_1 comprises blocks 221_1, . . . and 221_N, the flash memory chip 210_2 comprises blocks 222_1, . . . and 222_N, the flash memory chip 210_3 comprises blocks 223_1, . . . and 223_N, and the flash memory chip 210_4 comprises blocks 224_1, . . . and 224_N, where N is a positive integer greater than one. In this embodiment, the block 221_1 of the flash memory chip 210_1 stores an entire in-system programming (ISP) code 250, where the ISP code comprises a partial ISP code 252, and the partial ISP code 252 mainly comprises codes that allow the flash memory controller 110 to be able to respond to access requests of the host device 130. In this embodiment, when the flash memory controller 110 is performing initialization, or at any suitable time point, the microcontroller 112 therein may divide the partial ISP code 252 into a plurality of partial codes (such as four partial codes 262_1, 262_2, 262_3 and 262_4 in this embodiment), and stores theses four partial codes 262_1, 262_2, 262_3 and 262_4 into the flash memory chips 210_1, 210_2, 210_3 and 210_4, respectively. In this embodiment, the partial code 262_1 is stored into a block 221_A of the flash memory chip 210_1, the partial code 262_2 is stored into a block 222_B of the flash memory chip 210_2, the partial code 262_3 is stored into a block 223_C of the flash memory chip 210_3, and the partial code 262_4 is stored into a block 224_D of the flash memory chip 210_4, where any of A, B, C, D may be any suitable integer within the interval [1, N].

Figure 3:
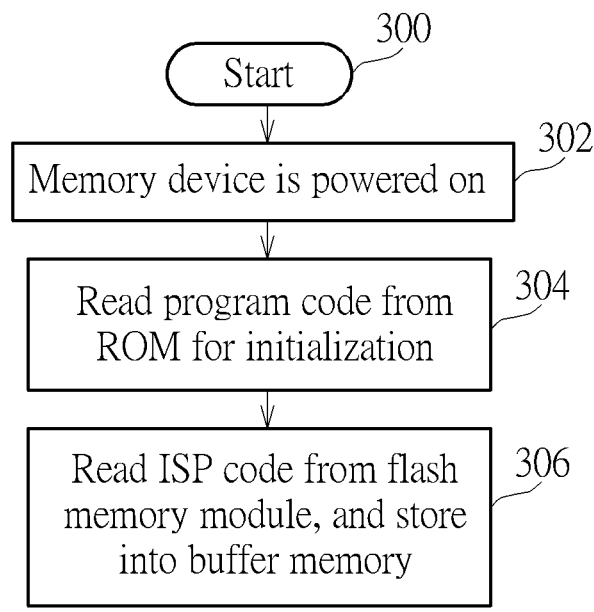
FIG. 3 is a flowchart illustrating operations of a memory device according to an embodiment of the present invention.

FIG. 3 is a flowchart illustrating operations of the memory device 100 according to an embodiment of the present invention. In Step 300, the flow starts. In Step 302, the memory device 100 is powered on. In Step 304, the microcontroller 112 reads the program code 112C from the ROM 112M, and performs initialization by executing the program code 112C. In Step 306, the microcontroller 112 reads the ISP code 250 from the block 221_1 of the flash memory chip 210_1, and stores the ISP code 250 into the buffer memory 116.

Figure 4:
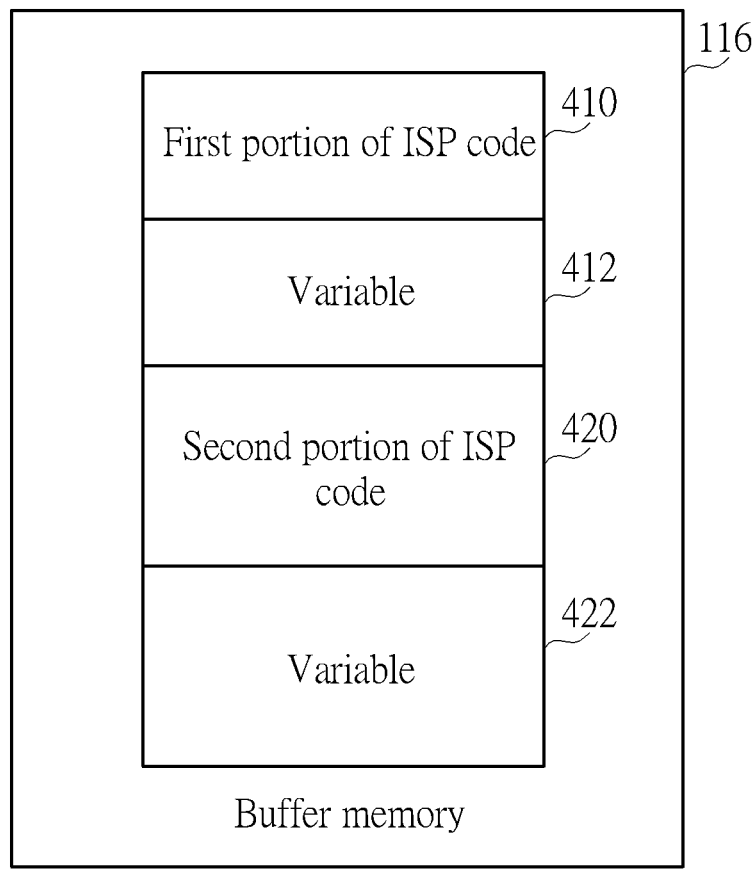
FIG. 4 is a diagram illustrating an ISP code stored in a buffer memory.

FIG. 4 is a diagram illustrating the ISP code 250 stored in the buffer memory 116, where the ISP code 250 may be divided into a first portion of ISP code 410 and a second portion of ISP code 420, where the buffer memory 116 also comprises variables 412 and 422. In this embodiment, the variables 412 and 422 may be stored in a system block (e.g. the block 221_1), and be read by the microcontroller 112 and loaded into the buffer memory 116. The first portion of ISP code 410 comprises some basic codes arranged for accessing the flash memory module 120, and the variable 412 may record addresses in which the four partial codes 262_1, 262_2, 262_3 and 262_4 shown in FIG. 2 are located within the flash memory chips 210_1, 210_2, 210_3 and 210_4; for example, block serial numbers or data page serial numbers. Additionally, the second portion of ISP code 420 mainly comprises the codes that allow the flash memory controller 110 to be able to respond to the access requests of the host device 130; for example, a read function code, a write function code, an erase function code and a search function code. Thus, the second portion of ISP code 420 comprises the partial ISP code 252 shown in FIG. 2. In some embodiments, the first portion of ISP code 410 may comprise the variable 412, and the second portion of ISP code 420 may comprise the variable 422.

In an embodiment, the first portion of ISP code 410 further comprises functions within the ISP code 250, which are related to system control; for example, a command translation layer related to a flash translation layer, where a main function of the command translation layer is dedicated to use a code for processing flash memory commands, and there is a need for operations of the command translation layer to allow various types of mapping tables to be read from the flash memory module 120. Additionally, the first portion of ISP code 410 may also comprise a code that needs to be executed when entering a normal mode from a power saving mode; for example, a code that is able to control or accelerate the flash memory controller and a portion of components within the flash memory module 120 to leave the power saving mode and recover a system state. In an embodiment, functions in the second portion of ISP code 420 may be small functions that are not needed to be executed in the power saving mode, or a portion of functions of the flash translation layer.

In an embodiment, the variable 412 may further comprise information within the flash translation layer, which is related to the current write operation of the flash memory module 120; for example, an address of a data page on which current data is written, or an address of a data page where the next data is going to be written. The variable 412 may also comprise information related to memory partitions within a protocol layer; for example, sizes and boundaries of respective partitions. The variable 412 may also comprise system setting values provided by the host device 130; these system setting values may be kept during the period between when the system is reset and turned on.

In an embodiment, the variable 422 may comprise some mapping tables that need to be referred to in the process of accessing the flash memory module 120; for example, a logical address to physical address mapping table and a physical address to logical address mapping table.

When the memory device 100 has not received any access command from the host device 130 for a while, the memory device 100 may choose to enter the power saving mode in order to save power consumption. At this moment, the flash memory controller 110 may disable a portion of functions itself, and disable a portion of the buffer memory 116. In this embodiment, the microcontroller 112 may disable the region that stores the second portion of ISP code 420 and the variable 422 within the buffer memory 116, and the second portion of ISP code 420 and the variable 422 may be therefore lost (or disappear).

Figure 5:
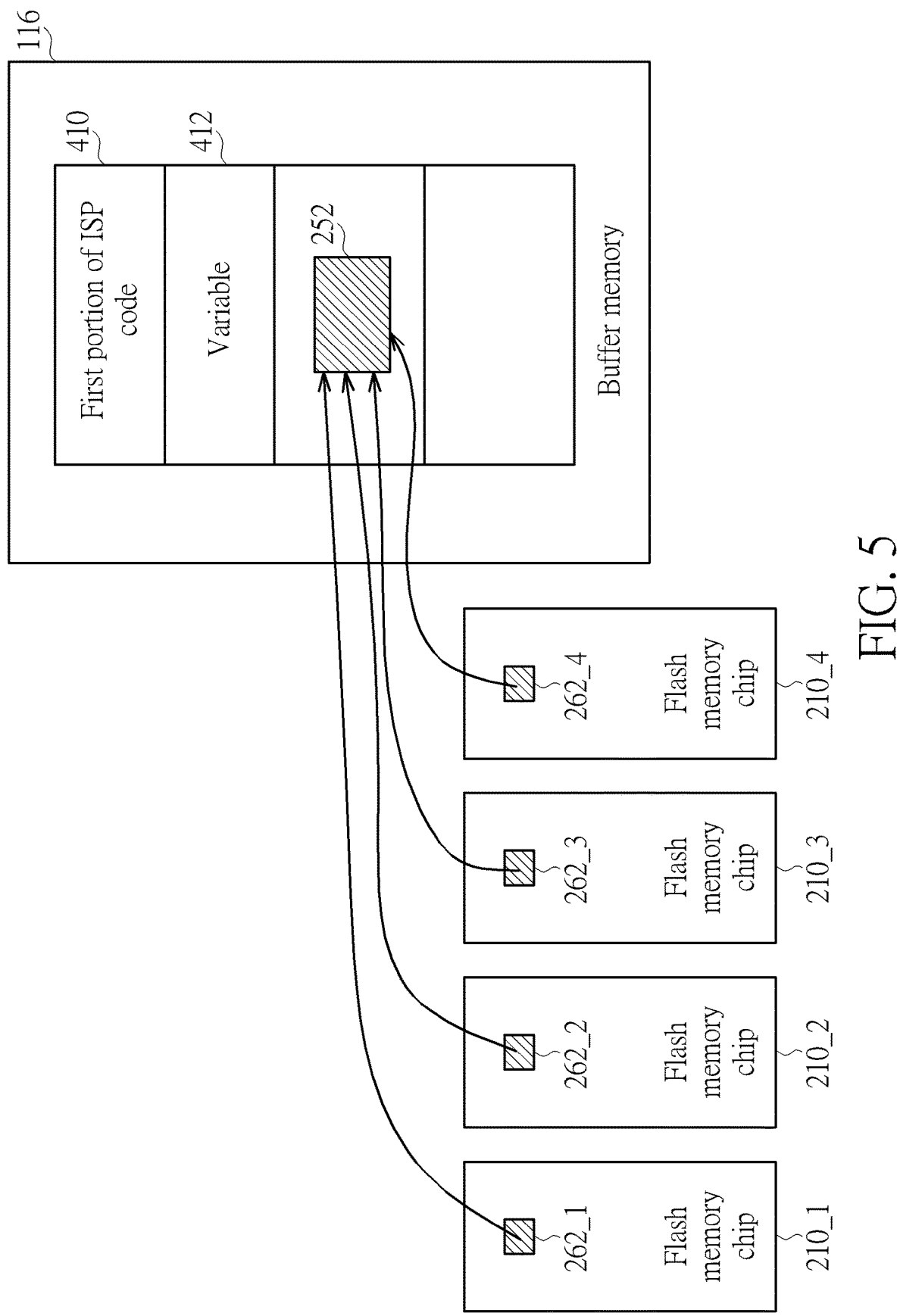
FIG. 5 is a diagram illustrating operations of reading four partial codes to re-build an ISP code.

When the memory device 100 receives an access command from the host device 130 in the power saving mode, the memory device 100 may prepare to leave the power saving mode and enter the normal mode. Since the second portion of ISP code 420 and the variable 422 stored by the buffer memory 116 are lost, the flash memory controller 110 needs to read the second portion of ISP code 420 from the flash memory module 120 again, to make the memory device 100 able to respond to the access requests of the host device. In this embodiment, in order to accelerate the re-building of the second portion of ISP code 420 in the buffer memory 116 as shown in FIG. 5, the flash memory controller 110 reads the four partial codes 262_1, 262_2, 262_3 and 262_4 from the flash memory chips 210_1, 210_2, 210_3 and 210_4 according to the addresses in which the four partial codes 262_1, 262_2, 262_3 and 262_4 are located within the flash memory chips 210_1, 210_2, 210_3 and 210_4, to thereby re-build the partial ISP code 252 (which is able to make the flash memory controller 110 respond to the access requests of the host device 130) within the second portion of ISP code 420 in the buffer memory 116.

In this embodiment, since the flash memory controller 110 may simultaneously transmit a chip enable signal to the flash memory chips 210_1, 210_2, 210_3 and 210_4 to make the flash memory chips 210_1, 210_2, 210_3 and 210_4 able to simultaneously start preparing to perform data read operations, the flash memory controller 110 may therefore be able to quickly read the four partial codes 262_1, 262_2, 262_3 and 262_4 from the flash memory chips 210_1, 210_2, 210_3 and 210_4, respectively. Thus, since the flash memory controller 110 utilizes a parallel read operation to read the four partial codes 262_1, 262_2, 262_3 and 262_4 without the need for reading the ISP code 250 from the block 221_1 of the flash memory chip 210_1, building the second portion of ISP code 420 can be accelerated, enabling the flash memory controller 110 to quickly respond to the access requests of the host device.

In an embodiment, the partial ISP code 252 comprises the read function code, and the read function code is separated into the four partial codes 262_1, 262_2, 262_3 and 262_4; for example, each of the four partial codes 262_1, 262_2, 262_3 and 262_4 comprises respective portions of the read function code.

In another embodiment, the partial ISP code 252 comprises a specific function code, where the specific function code is one of the write function code, the erase function code and the search function code, and the specific function code is separated into the four partial codes 262_1, 262_2, 262_3 and 262_4; for example, each of the four partial codes 262_1, 262_2, 262_3 and 262_4 comprises respective portions of the specific function code.

In this embodiment, since the four partial codes 262_1, 262_2, 262_3 and 262_4 may be regarded as a backup of the partial ISP code 252, the four partial codes 262_1, 262_2, 262_3 and 262_4 may perform data moving only under a condition of a firmware update operation (e.g. updating the ISP code 250), a garbage collection operation or a wear leveling operation. For example, when the ISP code 250 is updated, the flash memory controller 110 may divide at least one portion of an updated ISP code (e.g. the partial ISP code 252 that makes the flash memory controller 110 respond to the access requests of the host device) into four partial codes again, and store these four partial codes into different addresses within the flash memory chips 210_1, 210_2, 210_3 and 210_4, respectively.

In an embodiment, the partial ISP code 252 may be total contents of the second portion of ISP code 420 (e.g. the whole second portion of ISP code 420) within the buffer memory 116. In another embodiment, since the size of an ISP code is large and only a portion of functions are needed when the memory device 100 has just awoken, the partial ISP code 252 may be a portion of the second portion of ISP code 420 within the buffer memory 116; for example, the partial ISP code 252 only comprises the read function code in order to accelerate operations according to a specific access command from the host device.

In the above embodiments, the partial ISP code 252 is a portion of the ISP code 250, but the present invention is not limited thereto. In other embodiments, the partial ISP code 252 is the ISP code 250; for example, the four partial codes 262_1, 262_2, 262_3 and 262_4 are a backup of the whole ISP code 250.

In an embodiment, assuming that the flash memory module 120 will not completely be powered off and a cache memory within the flash memory module 120 is still workable when the memory device 100 enters the power saving mode, the flash memory controller 110 may write the ISP code 250 into the cache memory within the flash memory nodule 120 before the memory device 100 enters the power saving mode. When the memory device 100 leaves the power saving mode and returns to the normal mode, the flash memory controller 110 may directly read the ISP code 250 from the cache memory within the flash memory module 120 in order to accelerate re-building of the ISP code 250 in the buffer memory. Additionally, if the flash memory controller 110 detects that a power off condition occurs in the flash memory module 120, the embodiment shown in FIG. 5 may be further utilized to read the four partial codes 262_1, 262_2, 262_3 and 262_4 stored in the flash memory chips 210_1, 210_2, 210_3 and 210_4 in parallel.

Briefly summarized, the flash memory controller of the present invention separately stores an ISP code into a plurality of flash memory chips, and further utilizes a parallel read operation to read the ISP code from the plurality of flash memory chips when entering a normal mode from a power saving mode, to quickly finish reading the ISP code in order to accelerate processing of an access command from a host device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A flash memory controller, wherein the flash memory controller is arranged to access a flash memory module, the flash memory module comprises a plurality of flash memory chips, and the flash memory controller comprises:
  a read only memory, arranged to store a program code;
  a buffer memory, arranged to temporarily store an in-system programming (ISP) code; and a microcontroller, arranged to execute the program code and the ISP code to control access to the flash memory module;

wherein when the flash memory controller enters a power saving mode, the microcontroller disables a portion of the buffer memory to make at least one portion of the ISP code disappear; and when the flash memory controller enters a normal mode from the power saving mode, the microcontroller reads said at least one portion of the ISP code from N flash memory chips within the plurality of flash memory chips, wherein N is a positive integer greater than one;

wherein a specific flash memory chip within the N flash memory chips comprises a block that stores the ISP code, and the flash memory controller separately stores said at least one portion of the ISP code stored into the N flash memory chips;

wherein said at least one portion comprises N portions, the N portions are stored in the N flash memory chips, respectively, the buffer memory records a plurality of addresses in which the N portions are located within the N flash memory chips, and the plurality of addresses do not disappear from the buffer memory after the flash memory controller enters the power saving mode.

2. The flash memory controller of claim 1, wherein said at least one portion of the ISP code comprises a specific function code, the specific function code is divided into N portions and respectively stored in the N flash memory chips; and when the flash memory controller enters the normal mode from the power saving mode, the microcontroller reads the N portions from the N flash memory chips, respectively, and stores the N portions into the buffer memory.

3. The flash memory controller of claim 2, wherein the specific function code is a read function code.

4. The flash memory controller of claim 2, wherein the specific function code is a write function code, an erase function code or a search function code.

5. The flash memory controller of claim 1, wherein when the ISP code is updated, the flash memory controller respectively stores the N portions of said at least one portion of an updated ISP code into different addresses within the N flash memory chips.

6. The flash memory controller of claim 1, wherein the N portions respectively stored in the N flash memory chips perform data moving only under a condition of a firmware update operation, a garbage collection operation or a wear leveling operation.

7. An electronic device, comprising:
a flash memory module, comprising a plurality of flash memory chips; and
a flash memory controller, arranged to access the flash memory module,
wherein the flash memory controller comprises:
a buffer memory, arranged to temporarily store an in-system programming (ISP) code; and
a microcontroller, arranged to execute the ISP code to control access to the flash memory module;
wherein when the flash memory controller enters a power saving mode, the microcontroller disables a portion of the buffer memory to make at least one portion of the ISP code disappear; and when the flash memory controller enters a normal mode from the power saving mode, the microcontroller reads said at least one portion of the ISP code from N flash memory chips within the plurality of flash memory chips, wherein N is a positive integer greater than one;

wherein a specific flash memory chip within the N flash memory chips comprises a block that stores the ISP code, and the flash memory controller separately stores said at least one portion of the ISP code stored into the N flash memory chips;

wherein said at least one portion comprises N portions, the N portions are stored in the N flash memory chips, respectively, the buffer memory records a plurality of addresses in which the N portions are located within the N flash memory chips, and the plurality of addresses do not disappear from the buffer memory after the flash memory controller enters the power saving mode.

8. The electronic device of claim 7, wherein said at least one portion of the ISP code comprises a specific function code, the specific function code is divided into N portions and respectively stored in the N flash memory chips; and when the flash memory controller enters the normal mode from the power saving mode, the microcontroller reads the N portions from the N flash memory chips, respectively, and stores the N portions into the buffer memory.

9. The electronic device of claim 8, wherein the specific function code is a read function code.

10. The electronic device of claim 8, wherein the specific function code is a write function code, an erase function code or a search function code.

11. The electronic device of claim 7, wherein when the ISP code is updated, the flash memory controller respectively stores the N portions of said at least one portion of an updated ISP code into different addresses within the N flash memory chips.

12. The electronic device of claim 7, wherein the N portions respectively stored in the N flash memory chips perform data moving only when the flash memory controller performs a firmware update operation, a garbage collection operation or a wear leveling operation on the flash memory module.

13. A control method of a flash memory controller, comprising:
when the flash memory controller enters a power saving mode, disabling a portion of a buffer memory to make at least one portion of an in-system programming (ISP) code disappear; and
when the flash memory controller enters a normal mode, reading said at least one portion of the ISP code from N flash memory chips within a plurality of flash memory chips, wherein N is a positive integer greater than one;
wherein a specific flash memory chip within the N flash memory chips comprises a block that stores the ISP code, and the flash memory controller separately stores said at least one portion of the ISP code stored into the N flash memory chips;
wherein said at least one portion comprises N portions, the N portions are stored in the N flash memory chips, respectively, the buffer memory records a plurality of addresses in which the N portions are located within the N flash memory chips, and the plurality of addresses do not disappear from the buffer memory after the flash memory controller enters the power saving mode.

* * * * *